United States Patent
Jeffers et al.

(10) Patent No.: US 6,189,270 B1
(45) Date of Patent: *Feb. 20, 2001

(54) PANEL WALL CONSTRUCTION

(75) Inventors: Robert Eugene Jeffers, Ada; Karl Jahn Mead, Grand Rapids; Douglas Bruce MacDonald, Caledonia, all of MI (US); Charles Anthony Seiber, Atherton, CA (US)

(73) Assignee: Steelcase Development Inc., Grand Rapids, MI (US)

( * ) Notice: Under 35 U.S.C. 154(b), the term of this patent shall be extended for 0 days.

This patent is subject to a terminal disclaimer.

(21) Appl. No.: 09/260,783

(22) Filed: Mar. 2, 1999

Related U.S. Application Data

(62) Division of application No. 08/866,699, filed on May 30, 1997.

(51) Int. Cl.[7] ................. E04H 1/00; E04B 2/74

(52) U.S. Cl. ............... 52/220.7; 52/239; 52/481.2; 52/763; 52/783.14; 52/783.19; 52/580

(58) Field of Search .............. 52/220.1, 220.2, 52/220.7, 238.1, 239, 241, 243, 783.14, 783.19, 270, 783.11, 481.2, 580, 582.1, 578, 585.1

(56) References Cited

U.S. PATENT DOCUMENTS

| | | |
|---|---|---|
| 1,417,664 | 5/1922 | Garlinghouse . |
| 1,820,123 | 8/1931 | Donovan . |
| 1,981,240 | 11/1934 | McNeil . |
| 2,039,601 | 5/1936 | London . |
| 2,076,472 | 4/1937 | London . |
| 2,132,032 * | 10/1938 | Jacobsen .................. 52/238.1 X |
| 2,164,137 | 6/1939 | London . |
| 2,241,338 | 5/1941 | Balduf . |

(List continued on next page.)

FOREIGN PATENT DOCUMENTS

| | | |
|---|---|---|
| 835 646 | 4/1952 | (DE) . |
| 2 249 914 | 4/1974 | (DE) . |
| 2437400 * | 2/1976 | (DE) ........................ 52/783.17 |

(List continued on next page.)

OTHER PUBLICATIONS

Steelcase, "Cable Facts", 1993.
Steelcase, "New Data/Telecom Connector Housings", 1988.

(List continued on next page.)

*Primary Examiner*—Laura A. Callo
(74) *Attorney, Agent, or Firm*—Foley & Lardner

(57) ABSTRACT

A partition wall system provides for lay-in of cables. The system includes a plurality of interconnected panel sections and a plurality of covering skins. Each panel section has a base surface and a protrusion extending from the base surface. At least one of the covering skins is attached to each of the panel sections, forming a passage between the covering skin and the base surface of the panel section allowing the cables to travel between interconnected panel sections and through each panel section, in both horizontal and vertical directions. Interconnected panel sections may include first and second sheets of material, each sheet of material providing a base surface with a plurality of protrusions extending therefrom, wherein the first sheet of material is attached to the second sheet of material so that the base surface of the first sheet of material is substantially parallel to the base surface of the second sheet of material. Covering skins may thereby be attached to each of the panel sections to form a passage between the covering skin and the base surface of the panel section to allow the cables to travel between interconnected panel sections and through each panel section in both horizontal and vertical directions.

32 Claims, 15 Drawing Sheets

U.S. PATENT DOCUMENTS

| | | |
|---|---|---|
| 2,803,858 | 8/1957 | Rader . |
| 2,991,855 | 7/1961 | Buell et al. . |
| 3,037,593 | 6/1962 | Webster . |
| 3,065,575 | 11/1962 | Ray . |
| 3,312,025 | 4/1967 | Deakins . |
| 3,324,615 | 6/1967 | Zinn . |
| 3,324,617 | 6/1967 | Knight et al. . |
| 3,327,440 | 6/1967 | Watkins . |
| 3,534,463 | 10/1970 | Molin et al. . |
| 3,633,327 | 1/1972 | Klingensmith et al. . |
| 3,686,805 | 8/1972 | Pofferi . |
| 3,715,948 | 2/1973 | Liepings . |
| 3,759,001 | 9/1973 | Judkins et al. . |
| 3,802,146 | 4/1974 | Tacke et al. . |
| 3,863,412 | 2/1975 | Bodycomb et al. . |
| 3,925,948 | 12/1975 | Sauer et al. . |
| 3,939,620 | 2/1976 | Bero . |
| 3,982,370 | 9/1976 | Buffington . |
| 4,031,675 | 6/1977 | Roberts et al. . |
| 4,037,379 | 7/1977 | Ozanne . |
| 4,090,335 | 5/1978 | Curatolo . |
| 4,121,645 | 10/1978 | Behr . |
| 4,170,858 | 10/1979 | Walker . |
| 4,224,769 | 9/1980 | Ball et al. . |
| 4,351,870 | 9/1982 | English, Jr. . |
| 4,413,458 | 11/1983 | Ting . |
| 4,423,573 | 1/1984 | Omholt et al. . |
| 4,439,960 | 4/1984 | Jenkins . |
| 4,450,658 | 5/1984 | Legeal . |
| 4,567,698 | 2/1986 | Morrison . |
| 4,619,486 * | 10/1986 | Hannah et al. ..................... 312/195 |
| 4,716,699 | 1/1988 | Crossman et al. . |
| 4,783,941 | 11/1988 | Loper et al. . |
| 4,821,787 | 4/1989 | Swanson . |
| 4,833,848 | 5/1989 | Guerin . |
| 4,905,428 | 3/1990 | Sykes . |
| 4,944,122 | 7/1990 | Wendt . |
| 5,038,534 | 8/1991 | Pollock . |
| 5,038,539 | 8/1991 | Kelley et al. . |
| 5,042,213 | 8/1991 | Menchetti et al. . |
| 5,062,246 | 11/1991 | Sykes . |
| 5,117,599 | 6/1992 | Voss . |
| 5,134,826 | 8/1992 | La Roche et al. . |
| 5,165,213 | 11/1992 | Finch et al. . |
| 5,175,969 | 1/1993 | Knauf et al. . |
| 5,177,917 | 1/1993 | del Castillo Von Haucke . |
| 5,197,246 | 3/1993 | Hill . |
| 5,277,006 | 1/1994 | Ruster . |
| 5,309,686 | 5/1994 | Underwood et al. . |
| 5,341,615 | 8/1994 | Hodges et al. . |
| 5,377,466 | 1/1995 | Insalaco et al. . |
| 5,379,561 | 1/1995 | Saito . |
| 5,383,313 | 1/1995 | Deeke et al. . |
| 5,394,658 | 3/1995 | Schreiner et al. . |
| 5,399,406 | 3/1995 | Matsuo et al. . |
| 5,406,760 | 4/1995 | Edwards . |
| 5,426,904 | 6/1995 | Gilmore . |
| 5,473,851 | 12/1995 | Northrup, Jr. . |
| 5,543,204 | 8/1996 | Ray . |
| 5,561,958 | 10/1996 | Clement et al. . |
| 5,606,919 | 3/1997 | Fox et al. . |
| 5,768,845 * | 6/1998 | Beaulieu et al. .................... 52/585.1 |
| 5,804,763 | 9/1998 | Smeenge . |
| 5,813,178 | 9/1998 | Edwards . |
| 5,822,935 | 10/1998 | Mitchell et al. . |
| 5,826,385 | 10/1998 | Dykstra et al. . |
| 5,913,787 * | 6/1999 | Edwards ............................. 52/220.7 |
| 5,930,960 * | 8/1999 | Konnerth ....................... 52/220.7 X |
| 6,021,613 | 2/2000 | Reuter et al. . |
| 6,023,893 | 2/2000 | Tanaka . |
| 6,052,958 | 4/2000 | Miedema et al. . |

FOREIGN PATENT DOCUMENTS

| | | |
|---|---|---|
| 2741460 | 3/1979 | (DE) . |
| 28 35 952 A1 | 3/1979 | (DE) . |
| 2823236 | 11/1979 | (DE) . |
| 629756 | 3/1978 | (EP) . |
| 50241 | 4/1982 | (EP) . |
| 348268 * | 12/1989 | (EP) ..................................... 52/578 |
| 1 001 293 | 2/1952 | (FR) . |
| 1154245 * | 4/1958 | (FR) ..................................... 52/578 |
| 2 273 123 | 12/1975 | (FR) . |
| 700465 | 12/1953 | (GB) . |
| 2097836 | 11/1982 | (GB) . |
| 2 102 869 | 2/1983 | (GB) . |
| 2174733 | 11/1986 | (GB) . |
| 86407 | 5/1936 | (SE) . |
| 600280 | 3/1978 | (SU) . |
| 1294947 | 3/1987 | (SU) . |
| WO 96/36777 * | 11/1996 | (WO) . |

OTHER PUBLICATIONS

Structural Concepts Corporation, "Electronic Technical Furniture Information Processing Stations".

Artec, "Furniture Systems Installation".

Haworth, "All about Premise", Dec. 1996, pp. 2–186.

Steelcase® "Elective Elements® Cable Management Panel SPB89", 1989, pp. 1–2 and 4.

Stow & Davis® "Elective Elements Cable Management Panel Installation SP89", 1989.

Steelcase "Adding Grommet Holes To Standard Elective Elements Surface, Installation Directions", Jan. 31, 1989.

Structural Concepts Corporation, "Electronic Technical Furniture General Product Price List", May 1, 1983.

* cited by examiner

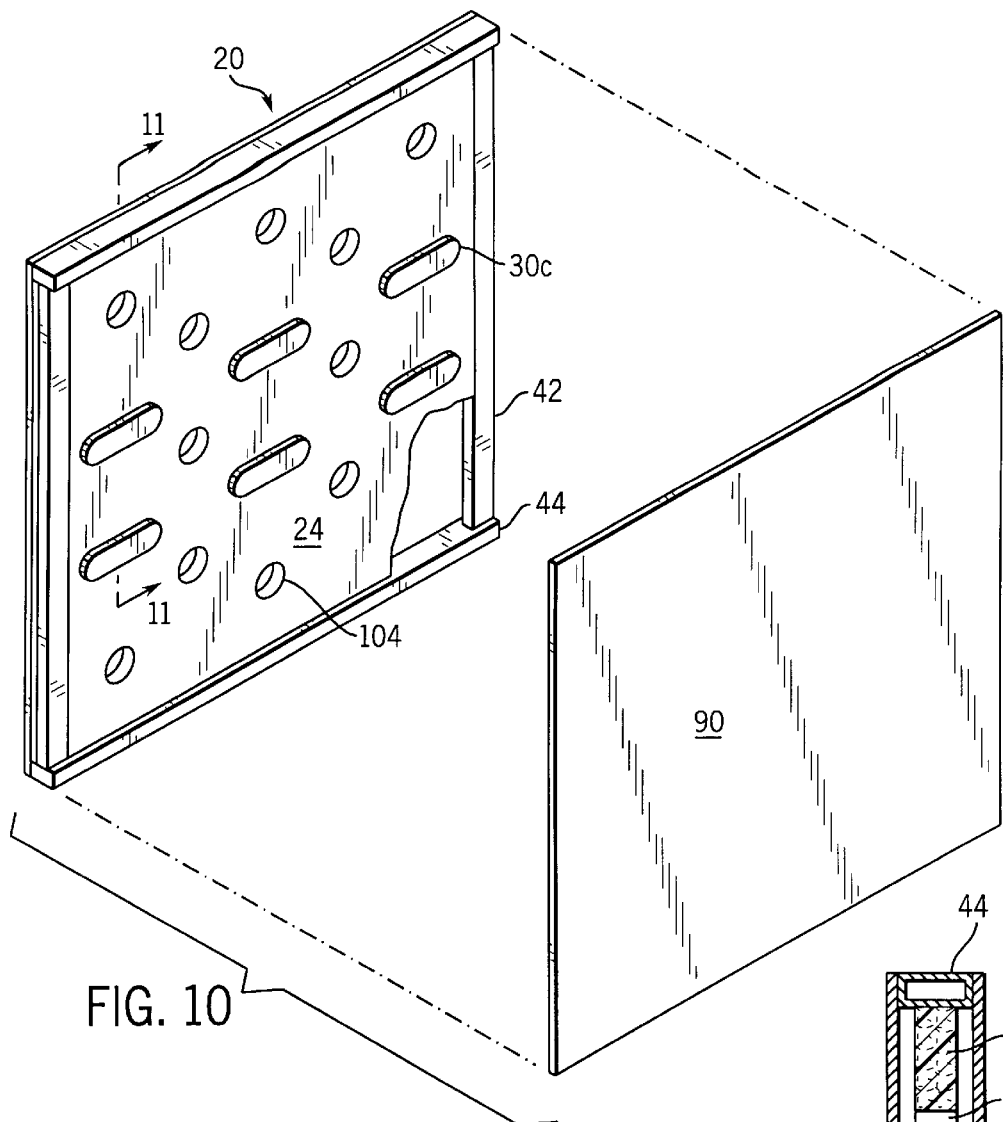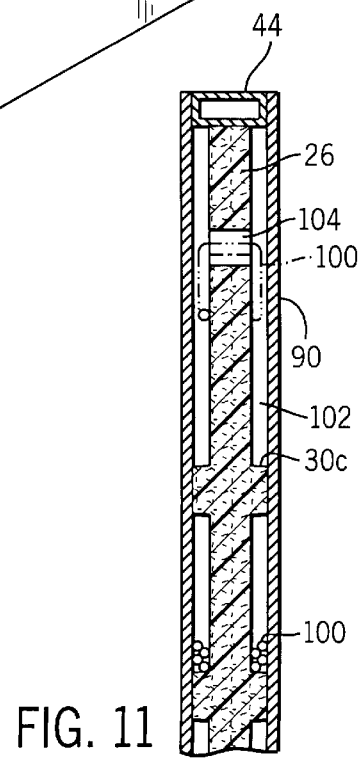

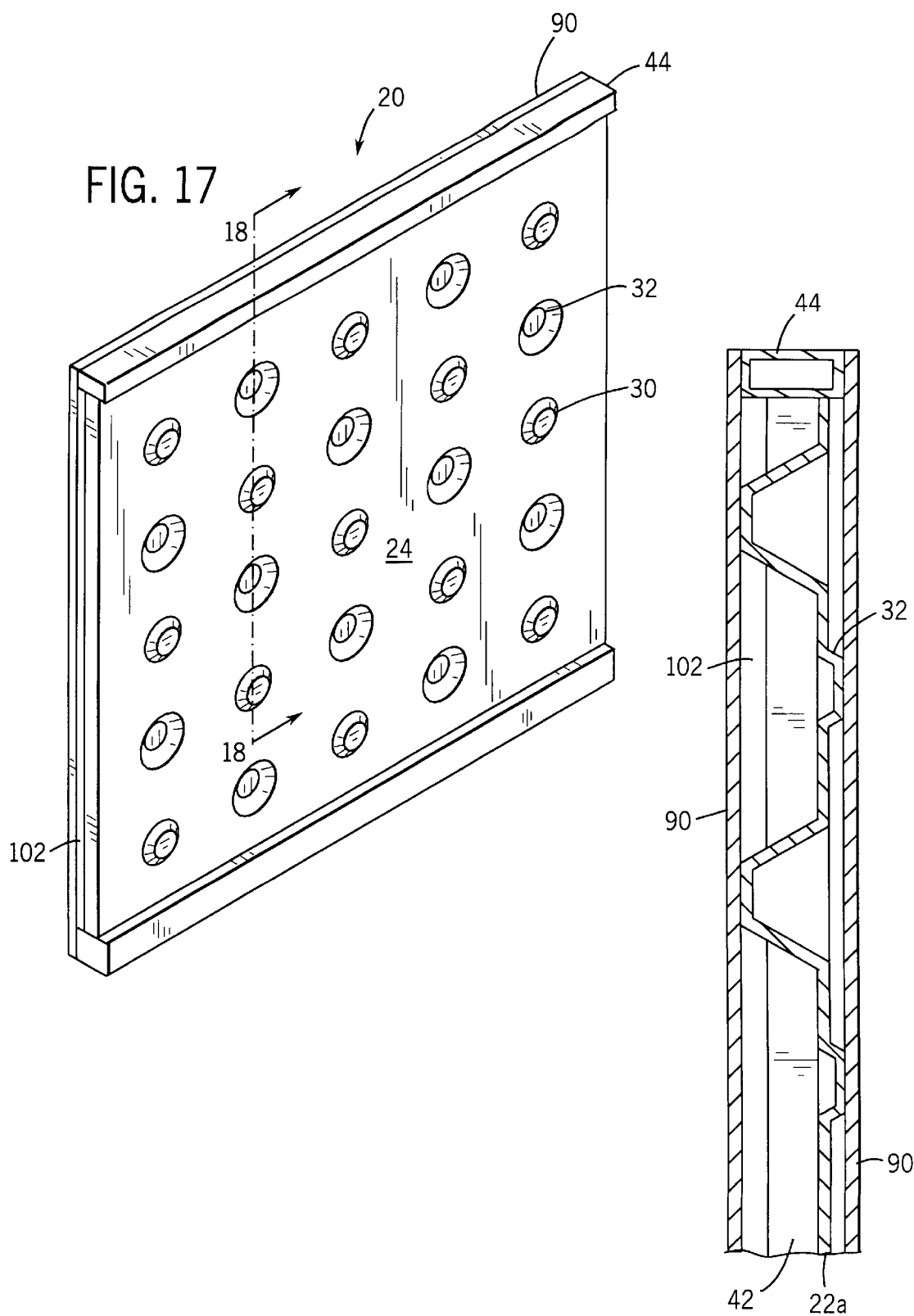

PANEL WALL CONSTRUCTION

RELATED APPLICATIONS

The present application is a division of U.S. patent application Ser. No. 08/866,699, titled "PANEL WALL CONSTRUCTION", filed on May 30, 1997, now allowed which is incorporated by reference herein.

Pending U.S. application (serial number to be determined) titled "PANEL WALL CONSTRUCTION" (filed on the same date as the present application) of common inventorship and commonly assigned (Ser. No. 08/866,702) is hereby incorporated by reference herein.

FIELD OF THE INVENTION

The present invention relates to a panel wall construction for a partition wall system. In particular, the present invention relates to a construction of a panel section that provides for improved cable management and lay-in capability in the horizontal and vertical directions within the partition wall system.

BACKGROUND OF THE INVENTION

It is well-known to divide interior space within an office environment or the like by employing a partition wall system constructed of interconnected panel sections. Systems of this type are commercially available from various sources including the assignee of the present application and have been described in promotional and related literature for products sold under the name Series 9000, Context, Montage and in various U.S. patents, such as U.S. Pat. No. 5,406,760, U.S. Pat. Nos. 5,394,658 and 4,224,769, which materials are hereby incorporated by reference. Such known partition wall systems not only can provide for efficient space division and office worker privacy but also for flexibility in layout and arrangement, as well as desirable aesthetics.

It has become increasingly important to provide for electrical and data (including telephony and computer network) connectivity to equipment installed within the various spaces provided by the partition wall system (and used by office workers therein). Ordinarily, such equipment is connected and networked through various power and data cables and wires, which may result in the accumulation of a plurality of such cables and wires to be routed into, through and within the space. (For a description of workplace wiring and cabling, see for example, the Steelcase Cable Facts guidebook (S372 dated June 1993), which is incorporated by reference herein.) As a result of the proliferation of equipment to be connected it has become increasingly necessary to manage the accumulation of cables and wires more efficiently. Specifically, it has become desirable to provide that such cables and wires be "hidden" or maintained out of view by the partition wall system, and yet be readily accessible to the corresponding equipment.

As a result, partition wall systems, for example, as disclosed in U.S. Pat. No. 5,341,615, which is incorporated by reference herein, have been constructed with cable management capability. Typically, the cable management capability is in the manner of cable troughs or defined tracks at a particular horizontal level or at a particular vertical position on or adjacent to the interconnected panel sections (i.e. within or between the panel sections at particular horizontal positions). See exemplary U.S. Pat. No. 5,277,006, which is incorporated by reference herein. It is also known to provide as an attachment or extension to the panel section a horizontal "raceway" (i.e. a track or conduit at or near the floor) or "beltway" (i.e. a track or conduit at or near the worksurface level) or the like through which cables may pass continuously from panel section to panel section as comprise the partition wall system. (Like tracks or conduits are also used for vertical cable routing.) However, the use of such attachments (which must be mounted to the panel sections) tends to add to the complexity and cost of the partition wall system (and its constituent parts and assemblies) as well as to the time and cost of assembly of the partition wall system in the office environment. Moreover, such "raceway" or "beltway" arrangements do not flexibly provide for horizontal and vertical cable or wire lay-in insofar as the cable passages are essentially pre-defined in either a horizontal or vertical direction. Furthermore, special equipment (e.g. mounting hardware, etc.) is sometimes required in such existing systems to pass cables or wires along between adjoining panel sections of the partition wall system, which further can adversely affect cost and flexibility.

Accordingly, it would be advantageous to provide for the construction of a panel section in a partition wall system that readily provides for flexible cable management. It would also be advantageous to provide for a panel section of a relatively simple construction that provides for relative ease of installation and of cable lay-in during assembly of the partition wall system. It would further be advantageous to provide for a panel section that is suitable for low-cost fabrication and can be used with a wide variety of covering skins and in a wide range of applications and installations of partition wall systems.

SUMMARY OF THE INVENTION

The present invention relates to a partition wall system providing for lay-in of cables, which includes a plurality of interconnected panel sections and a plurality of covering skins. Each panel section has a base surface and a protrusion extending from the base surface. At least one of the covering skins is attached to each of the panel sections, forming a passage between the covering skin and the base surface of the panel section allowing the cables to travel between interconnected panel sections and through each panel section, in both horizontal and vertical directions.

The present invention also relates to a partition wall system providing for lay-in of cables including a plurality of interconnected panel sections that include a sheet of material providing a base surface. The system includes covering skins attached to each of the panel sections so that a passage is formed between the covering skin and the base surface of the panel section, in which the cables travel between interconnected panel sections and through each panel section in both horizontal and vertical directions.

The present invention further relates to a partition wall system providing for lay-in of cables, including interconnected panel sections including first and second sheets of material, each sheet of material providing a base surface with a plurality of protrusions extending therefrom, wherein the first sheet of material is attached to the second sheet of material so that the base surface of the first sheet of material is substantially parallel to the base surface of the second sheet of material. Covering skins are attached to each of the panel sections to form a passage between the covering skin and the base surface of the panel section to allow the cables to travel between interconnected panel sections and through each panel section in both horizontal and vertical directions.

DESCRIPTION OF THE DRAWINGS

FIG. 10 is a perspective view of a panel section (with one covering skin attached) according to an alternative embodiment of the present invention.

FIG. 11 is a sectional view of the panel section of FIG. 10 (with both covering skins attached) also showing an exemplary cable management arrangement.

FIG. 17 is a perspective view of a panel section (with one covering skin attached) according to an alternative embodiment of the present invention.

FIG. 18 is a sectional view of the panel section of FIG. 17 (with both covering skins attached)

DETAILED DESCRIPTION OF THE PREFERRED EMBODIMENTS

Figure 1:
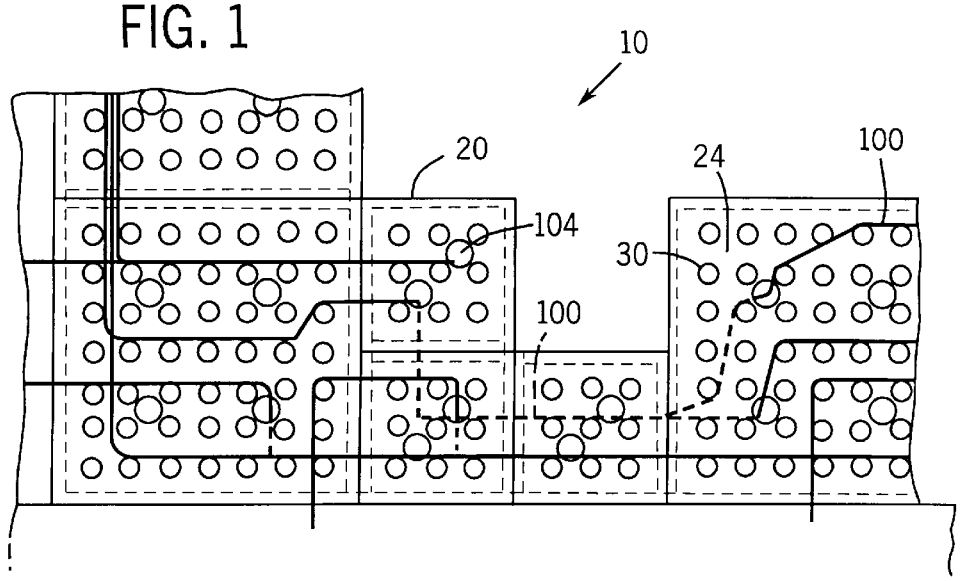
FIG. 1 is an elevation view of the front of a partition wall system showing panel sections (shown without covering skins) and exemplary cable management arrangement (showing cables passing therethrough and therealong in horizontal, vertical and diagonal directions) according to a preferred embodiment of the present invention.

Referring to FIG. 1, a partition wall system 10 according to a preferred embodiment of the present invention is shown. Partition wall system 10 includes a plurality of interconnected panel sections 20 and corresponding covering skins (not shown in FIG. 1). Also shown in FIG. 1 are cables (shown as wires 100) that provide electrical or data (i.e. computer or telephony or the like) connections between various types of equipment (not shown) that may be included in offices or workspaces formed by the partition wall system. As shown, partition wall system 10 provides for a flexible cable management arrangement wherein cables 100 run in horizontal, vertical and diagonal directions along both sides of (and between) panel sections 20 (or from or into existing floors, ceilings or walls). (Cables 100 on the opposite side of panel sections 20 are shown in phantom lines.)

Figure 2:
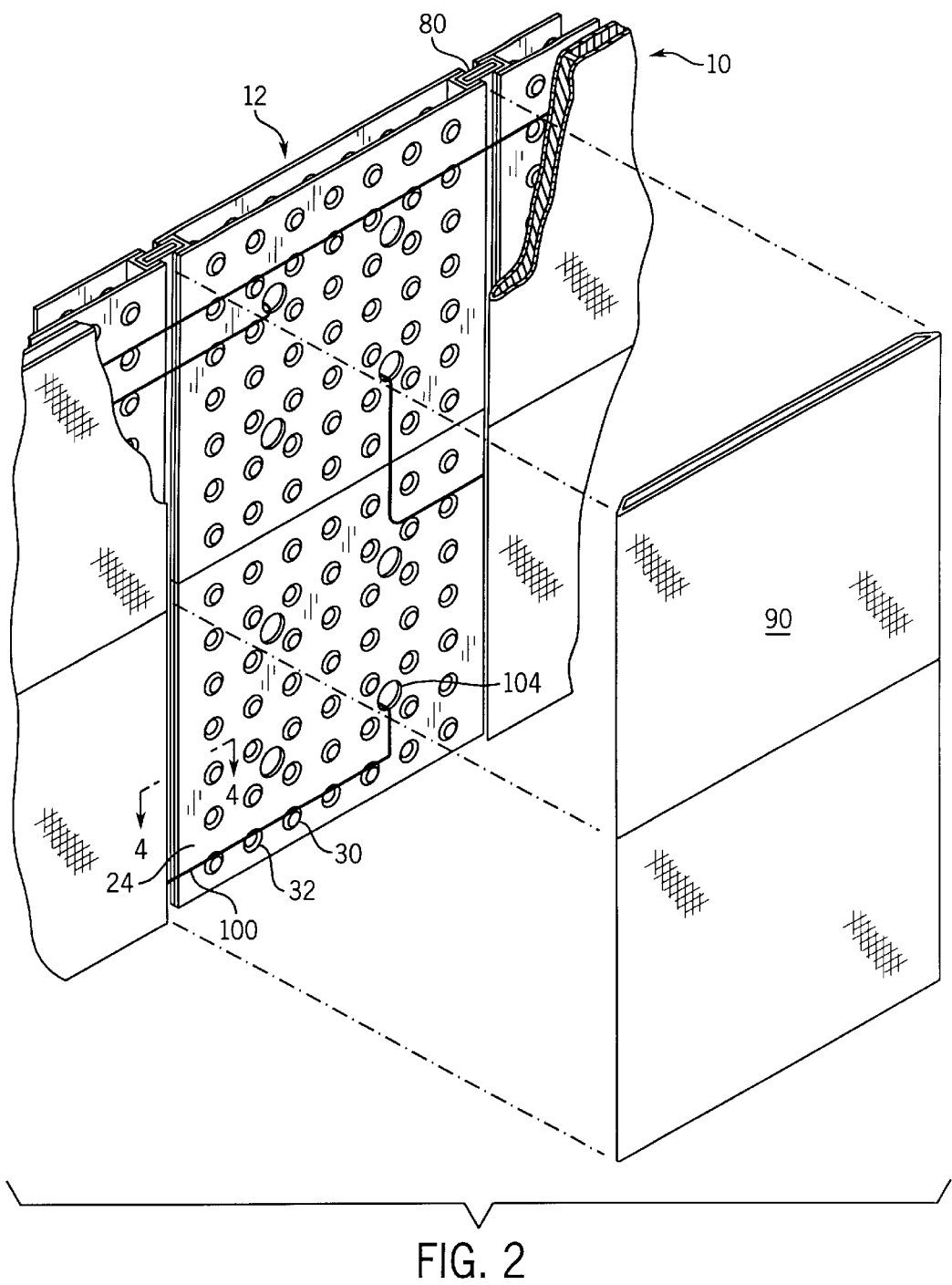
FIG. 2 is a fragmentary and exploded perspective view of a partition wall system constructed of interconnected panel sections and covering skins showing an exemplary cable management arrangement according to a preferred embodiment of the present invention.

Referring now to FIG. 2, partition wall system 10 is shown in perspective view. Shown in FIG. 2 are panel sections 20 along with corresponding covering skins 90. As is evident from FIG. 2, passages for cables 100 are defined through spaces provided between a series of protrusions (shown as frusto-conical projections 30) that extend from base surface 24 of walls 22 of panel section 20. Panel section 20 also includes a series of depressions (shown as frusto-conical indentations 32) in walls 22. As is readily apparent, while frusto-conical shapes are shown, and may be particularly preferred shapes for protrusions (30) and depressions (32), a wide variety of other shapes (such as circles, domes, squares, blocks, trapezoids etc.) may be employed according to alternative embodiments. A set of apertures (holes 104) in walls 22 of panel section 20 further facilitate cable management by allowing cables 100 to be passed through from one side to the other side of panel section 20.

Figure 4:
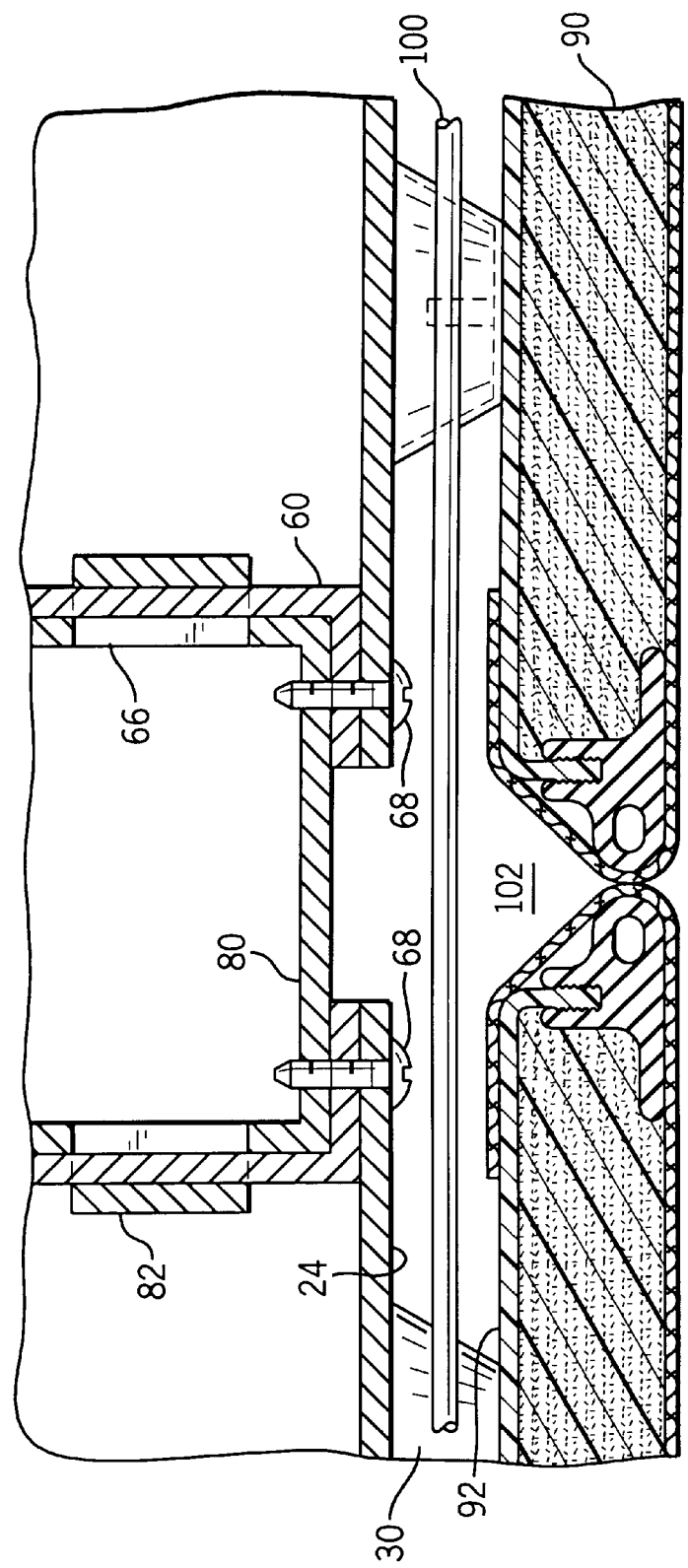
FIG. 4 is a fragmentary sectional plan view of a partition wall system showing a detail of the interconnection of panel sections to a mounting post as well as the attachment of covering skins and cable management arrangement according to a preferred embodiment of the present invention.

As shown in FIGS. 2 and 4, protrusions 30 extending from base surface 24 of outer wall 22 of the panel sections 20 form an at least partially uninterrupted and contiguous space 102 between base surface 24 of panel sections 20 and the inner surface (wall 92) of covering skin 90. As is evident from FIGS. 2 and 4, space 102 defines a passage for cables 100 (i.e. paths through contiguous space) in both horizontal and vertical directions (and also in various diagonal orientations) not only within a particular panel section but also between and across interconnected panel sections (i.e. across mounting posts 80). According to the any preferred embodiments, the provision of this flexible cable management arrangement is not affected by the covering skins or their attachment to the corresponding panel sections.

Figure 3:
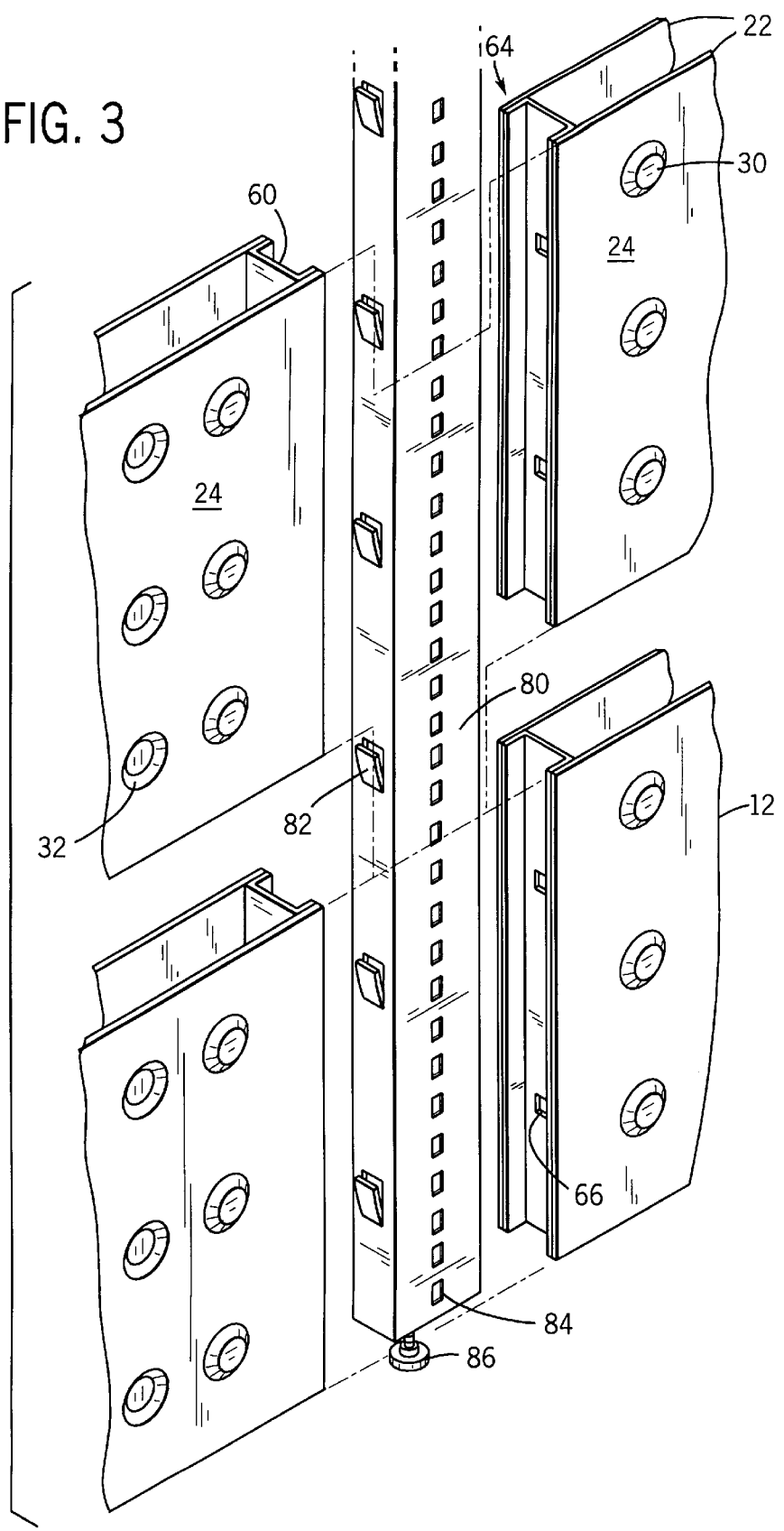
FIG. 3 is an exploded perspective view of the partition wall system showing the interconnection of panel sections to a mounting post according to a preferred embodiment of the present invention.
Figure 5:
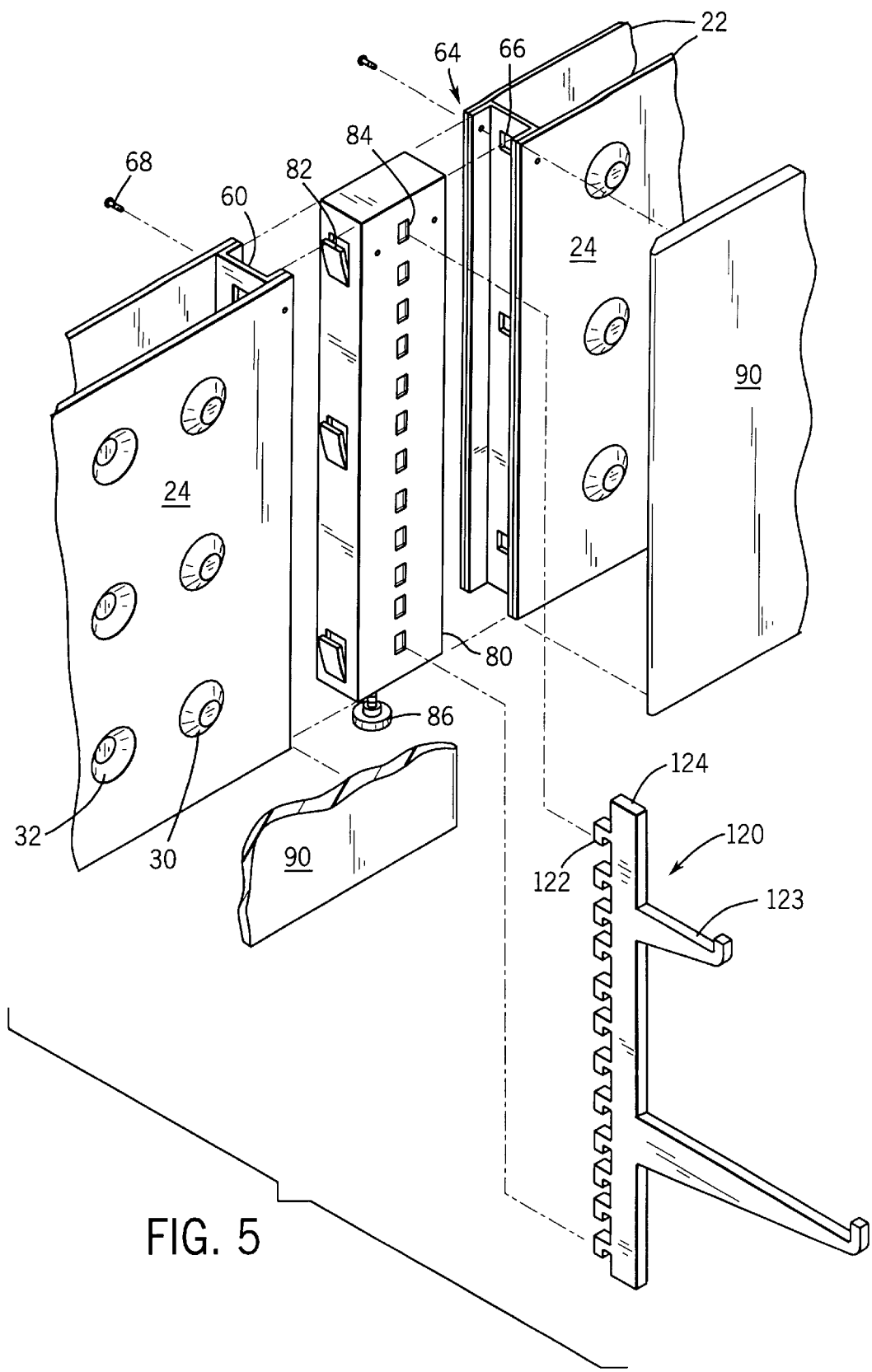
FIG. 5 is a fragmentary and exploded perspective view of a partition wall system showing the interconnection of panel sections to a mounting post as well as a mounting structure (for attaching work surfaces or binder bins or other accessories) according to a preferred embodiment of the present invention.

Returning to FIGS. 2 through 4, according to a preferred embodiment, panel sections 20 have a partially hollow construction and are formed of walls 22 and channels 60 (which have a "[-shaped" cross-section). Channels 60, which are mounted or fastened to the lateral ends of walls 22 (i.e. by welding or the like), as shown in FIG. 3, provide for the rigidification of panel sections 20. In addition, channels 60 provide a mounting structure for interconnecting panel sections 20 to form the partition wall system. FIGS. 3 through 5 also show a vertical mounting post 80 used to interconnect the adjacent panel sections 20 (fasteners such as screws 68 can be used to secure the walls of each panel section to vertical mounting post 80).

Covering skins according to any preferred embodiment can serve a functional or decorative function as is well-known to those of skill in the art who review this disclosure (and may also be referred to as "tiles" or "surfaces" or like terms), for example as shown in U.S. Pat. Nos. 4,876,835 and 5,038,539, which are incorporated by reference.

According to a particularly preferred embodiment, walls 22 are formed from a metal sheet into which protrusions 30 and depressions 32 are formed (by stamping or the like). As is known of those of skill in the art of metalworking, the type and thickness of the metal sheet can be varied according to various cost and performance criteria. According to alternative embodiments, the walls can be made of a sheet of another type of material (such as a plastic, sheet-molding compound, resin, resin-rich fabric, fiber, composite, fiber-reinforced plastic) which can be formed by extrusion, pultrusion, vacuum forming, pressure forming, injection molding, blow molding or the like. In any preferred embodiment, the sheet (or sheets) which forms the wall or septum must be of a material of suitable strength (and a thickness) to provide both for a rigid panel section (at least when constructed into the partition wall system) and for attaching a covering skin. (According to alternative embodiments, the panel section can be formed from a single sheet of bent or folded material.)

Figure 25:
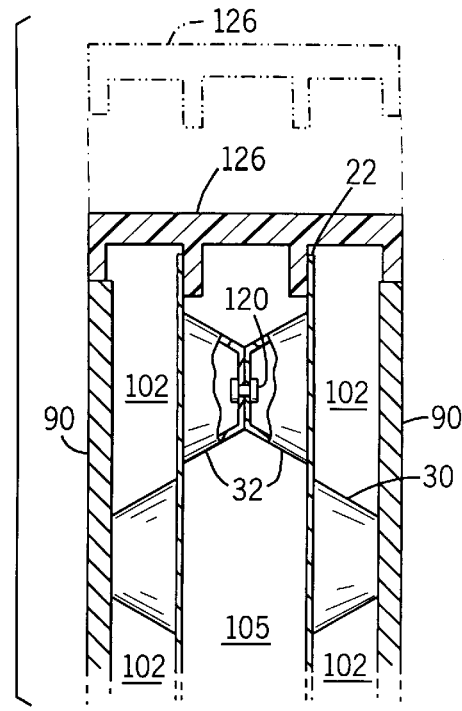
FIG. 25 is a fragmentary sectional view of a panel section (with covering skins) showing the installation of a top cap according to an alternative embodiment of the present invention.
Figure 26:
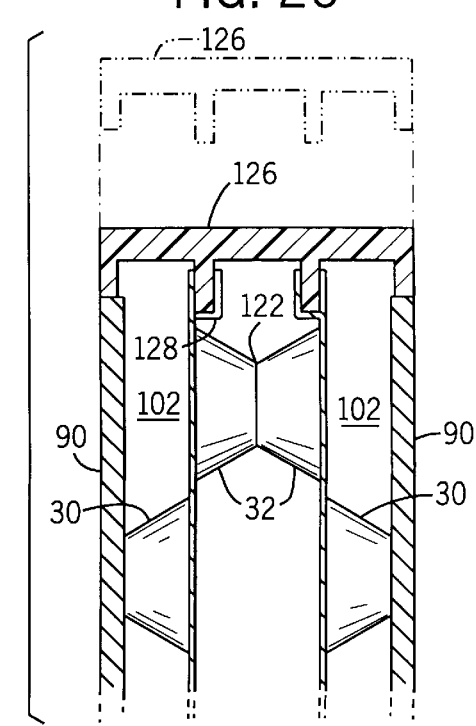
FIG. 26 is a fragmentary sectional view of a panel section (with covering skins) showing the installation of a top cap according to an alternative embodiment of the present invention.
Figure 27:
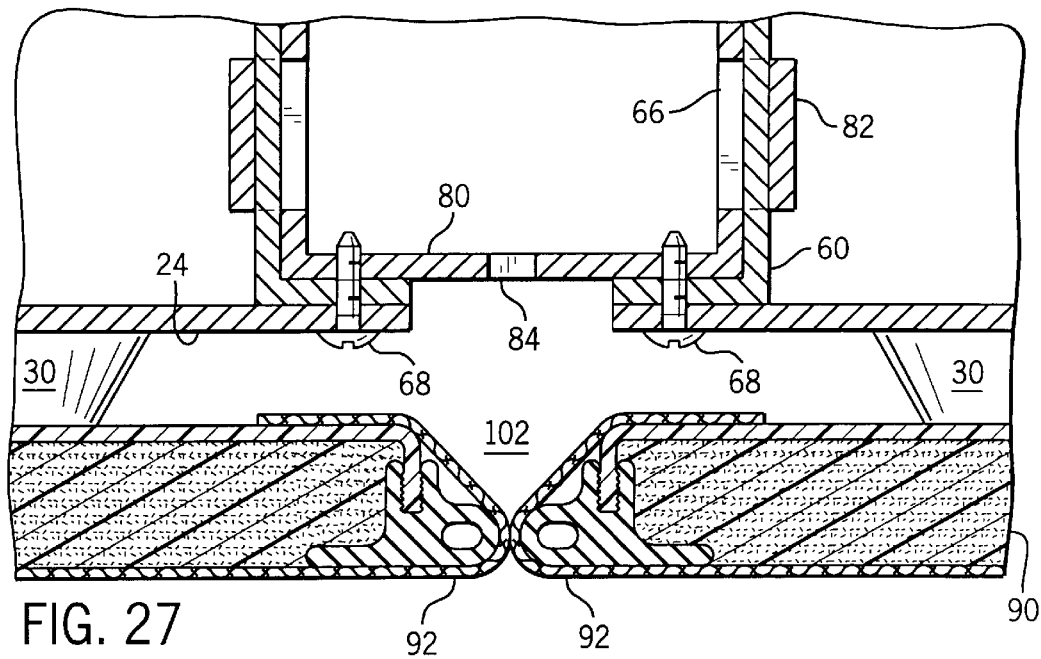
FIGS. 27 and 28 are fragmentary plan views of a partition wall system showing a detail of the interconnection of panel sections to a mounting post as well as the attachment of covering skins and a mounting structure (for attaching work surfaces or binder bins or other accessories) according to a preferred embodiment of the present invention.
Figure 28:
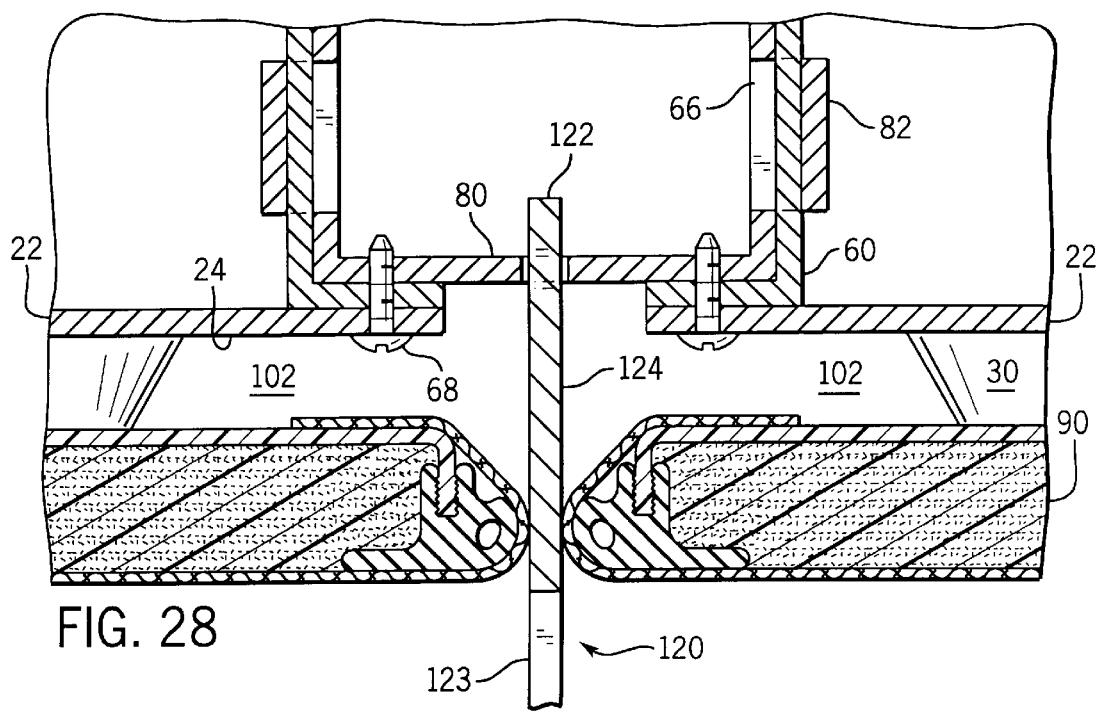

According to a particularly preferred embodiment, the rigidity or structural integrity of the panel section is reinforced by the arrangement and shape of the depressions of each wall, which depressions are of a sufficient depth to abut at the center of the panel section. The arrangement of abutting (frusto-conical) depressions of walls 22 of panel section 20 is shown in FIG. 9, as well as FIGS. 25 and 26. As shown in FIGS. 25 and 26, abutting depressions of each wall 22 may be secured together by a fastener (such as rivet 120) or by a weld 122. The panel sections may thus be constructed with the walls themselves providing the necessary structure (i.e. without requiring any supplementary structure such as posts or beams).

Figure 6:
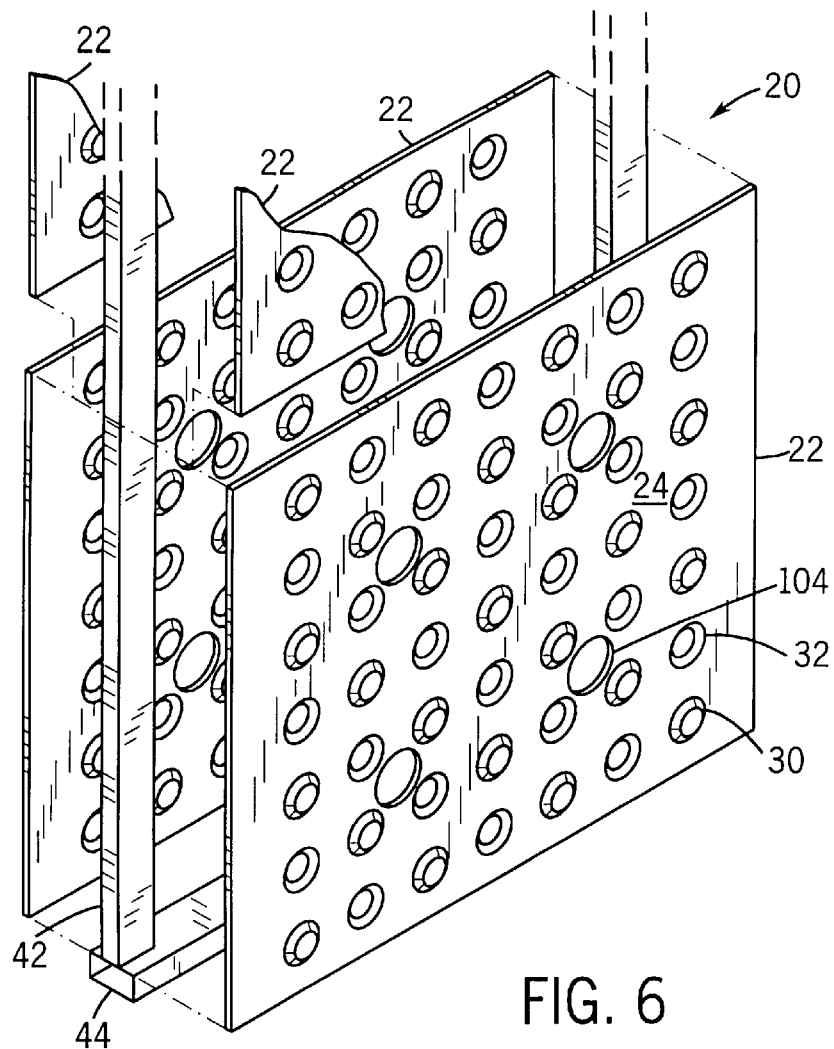
FIG. 6 is an exploded perspective view of a panel section according to an alternative embodiment of the present invention.
Figure 7:
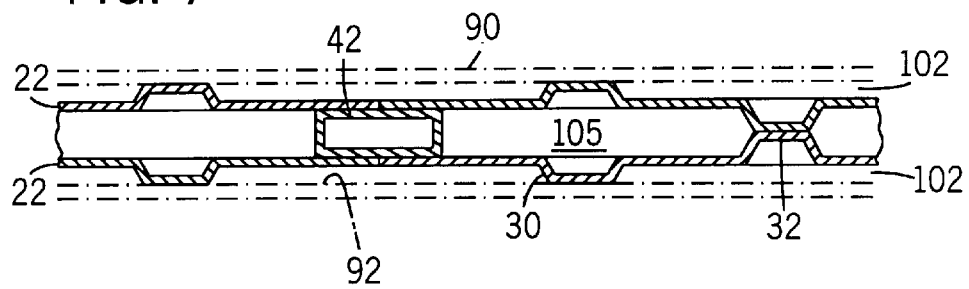
FIG. 7 is a sectional plan view of a partition wall system showing the interconnection of panel sections (with covering skins shown in phantom lines) according to an alternative embodiment of the present invention.

According to alternative embodiments, the walls may be formed without depressions, or the depressions may be shallower, as shown in FIG. 6, where walls 22 of panel section 20 are structurally reinforced according to an alternative embodiment. The reinforcement employs a set of vertical posts 42 and horizontal beams 44 (one is shown) to which walls 22 can be mounted or fastened (i.e. by welding or the like). As shown in FIG. 6, a "stacking" arrangement can be effected by providing for a vertical post 42 that spans two (or more) walls 22 (of panel section). According to a preferred embodiment, each of post 42 and beam 44 is formed as a hollow metal tube (shown as having a rectangular shape), welded to each of walls 22 to form an integrated panel section 20.

Figure 8B:
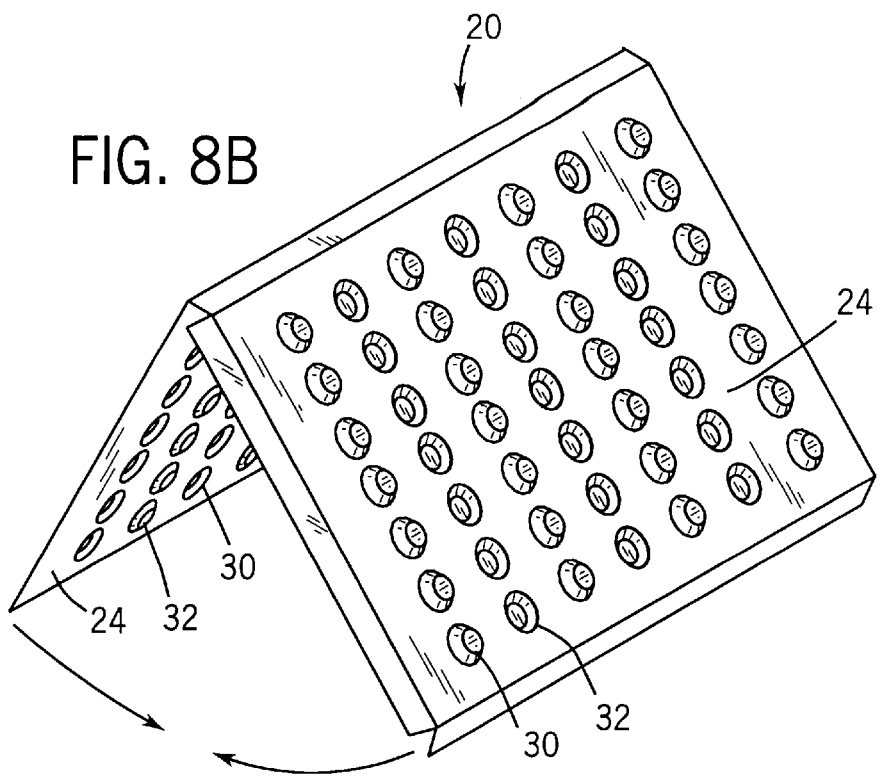
FIGS. 8A and 8B are perspective views of a panel section according to an alternative embodiment of the present invention.
Figure 8A:
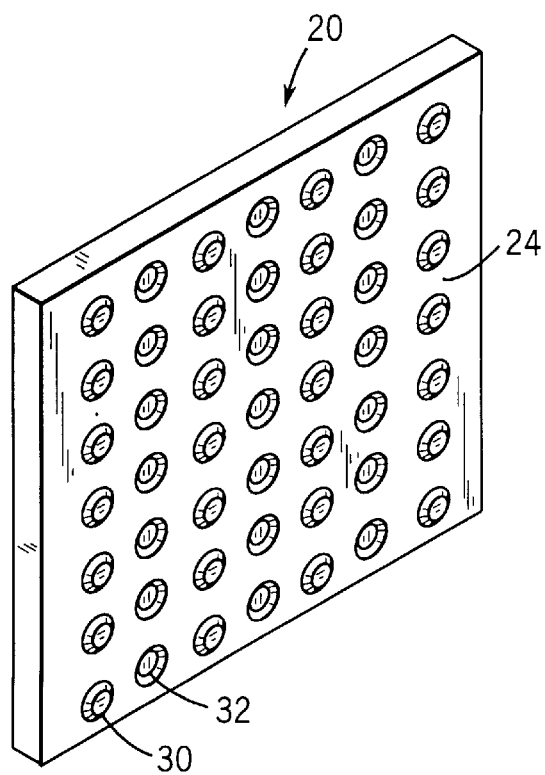
Figure 12:
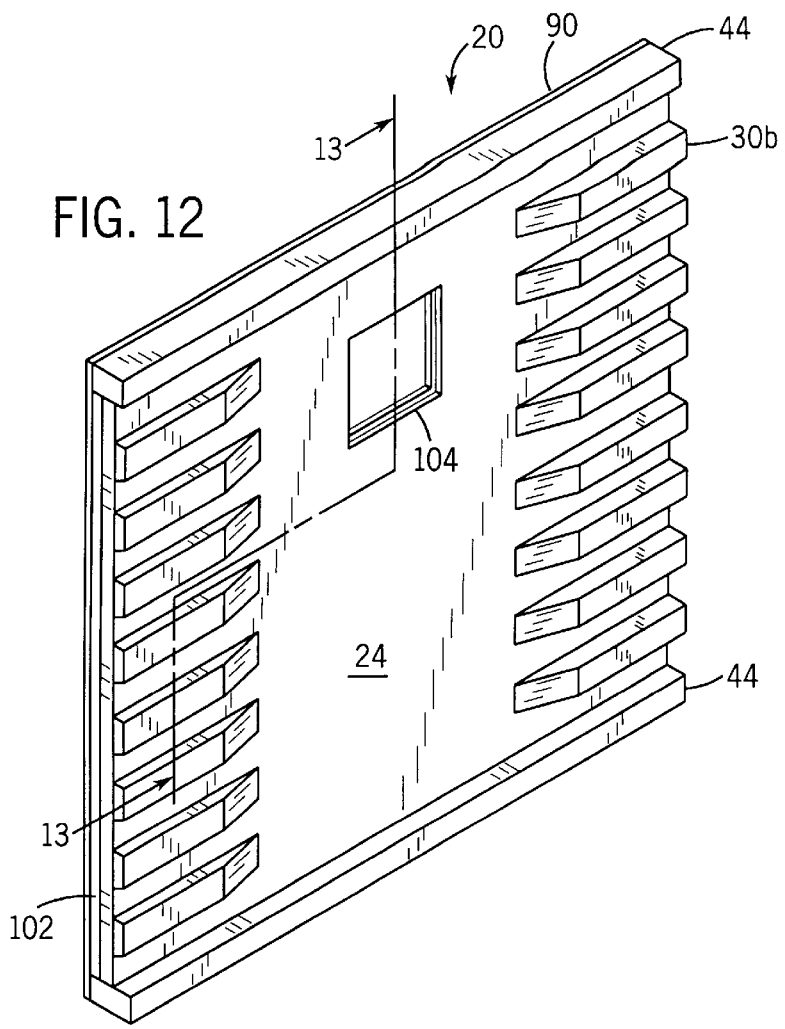
FIG. 12 is a perspective view of a panel section (with one covering skin attached) according to an alternative embodiment of the present invention.
Figure 13:
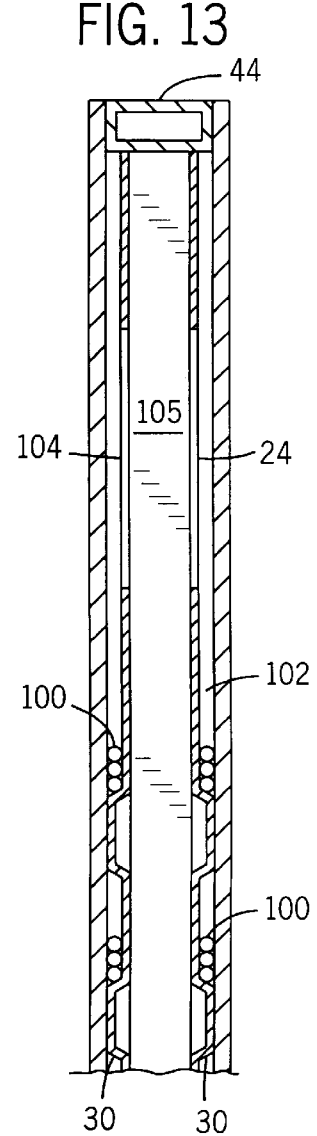
FIG. 13 is a sectional view of the panel section of FIG. 12 (with both covering skins attached) also showing an exemplary cable management arrangement.

As shown in FIGS. 6 through 18, according to alternative embodiments, a wide variety of shapes and arrangements of walls (with associated structures) may be employed in the construction of a panel section in a partition wall system that flexibly provides for cable management and lay-in capability. For example, as shown in FIGS. 8 and 9, a panel section 20 can be formed of a hollow but sufficiently rigid structure by walls 22 having a complementary pattern of opposing and abutting protrusions 30 and depressions 32. The pattern of protrusions 30 and depressions 32 can be symmetrical and alternating, or in some other arrangement (for example, having pattern of two depressions followed by two protrusions or some other asymmetrical arrangement). FIGS. 8A and 8B show a panel section 20 formed from walls 22 that do not require any supplementary rigidifying structure. According to the embodiment shown in FIG. 8B, panel section 20 is formed from a single sheet of folded (or bent) material (secured with a weld or fasteners or the like). Alternatively, panel section 20 can be formed from two sheets of material that are secured or fastened together.

Figure 9A:
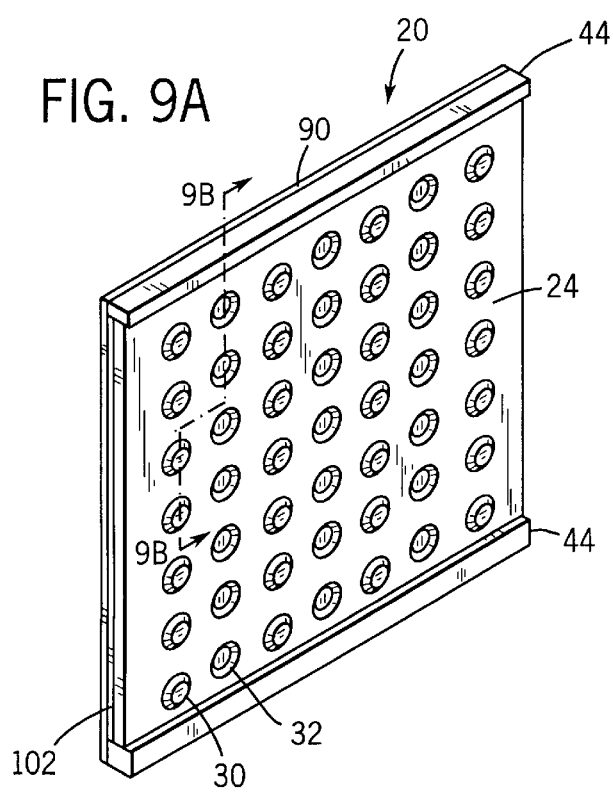
FIG. 9A is a perspective view of a panel section (with one covering skin attached) according to an alternative embodiment of the present invention.
Figure 9B:
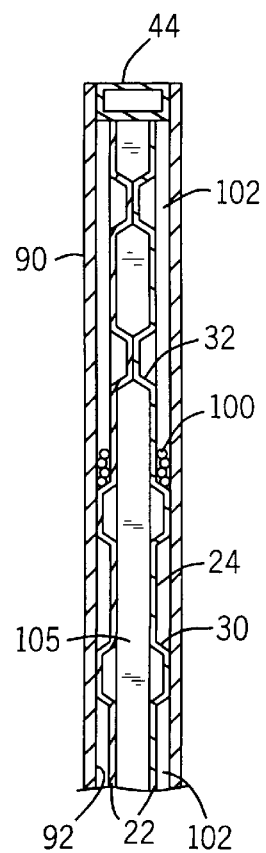
FIG. 9B is a sectional view of the panel section of FIG. 9A (with both covering skins attached) also showing an exemplary cable management arrangement.
Figure 14:
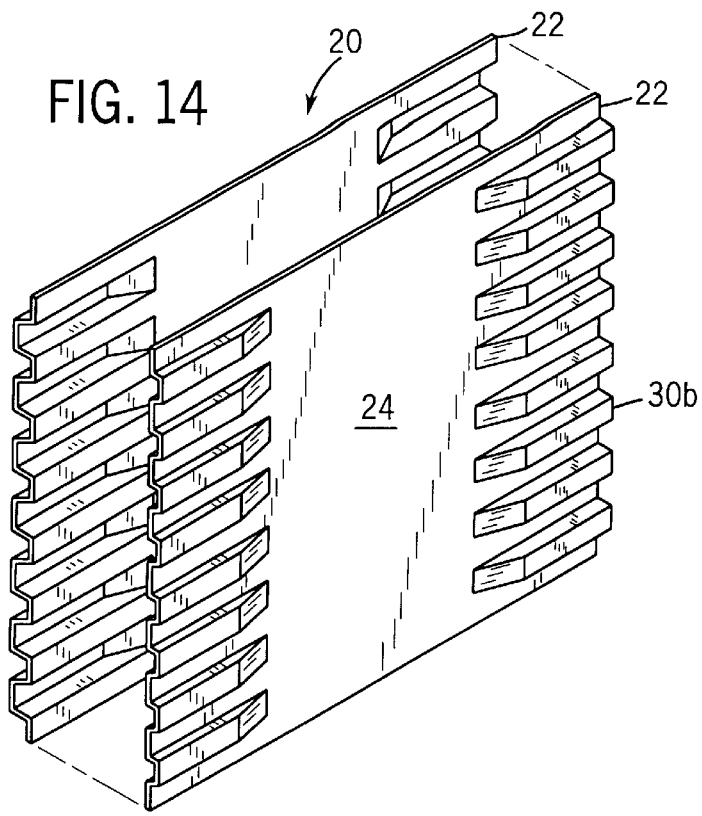
FIG. 14 is an exploded perspective view of a panel section according to an alternative embodiment of the present invention.

According to the embodiments shown in FIGS. 9A and 9B, a pair of rigidifying horizontal beams 44 is provided, however in other embodiments, wherein the metal sheets of walls 22 provide sufficient structural strength to form a suitably rigid panel section 22, the horizontal beams 44 would not be necessary. (For example, FIG. 14 shows a construction of panel section 20 where walls 22 abut within the panel section and can be attached for rigidification). As shown in the preferred embodiments, covering skins 90 attach to panel section 20 on the flat leading edge of protrusions 30; a space 102 for cables 100 is provided on either side of panel section 20 between the outer surfaces of walls 22 and the inner surfaces of covering skins 90. Hollow inner areas 105 of panel section 20 may be left open or filled with a material (such as a foam, urethane, etc.) intended to provide for structural reinforcement or attenuation of sound (or some other purpose known to those of skill in the art who review this disclosure).

Similarly, as shown in FIGS. 10 and 11, a panel section 20 can be constructed of solid core 26 formed with protrusions 30 (and holes 104 to allow for cross-over of a cable 100 from one side of the panel section 20 to the other). Protrusions 30c are elliptical in shape but, according to alternative embodiments, can have other shapes (see for example FIGS. 12 and 13). According to alternative embodiments, some or all of the protrusions can be separate elements that are attached or mounted to the walls by known techniques such as adhesives, fasteners, welding, etc. According to particularly preferred embodiments, the solid core can be a wood or wood composite or a foam or other composite material (although a wide variety of other materials may also be used). See for example U.S. Pat. Nos. 2,241,338 and 4,423,573, which are incorporated by reference herein. If the solid core (which may be coated or covered with an external membrane or surface finish) provides sufficient structure and strength for mounting the covering skins, and forming the rigid panel section for use in the partition wall system, then it may not be necessary to provide a supplemental structure (shown in FIGS. 10 and 11 as vertical posts 42 and horizontal beams 44). FIG. 11 illustrates that space 102 is provided when covering skins 90 are attached to protrusions 30 of panel section 20 to define a lay-in passage for cables 100.

Figure 15:
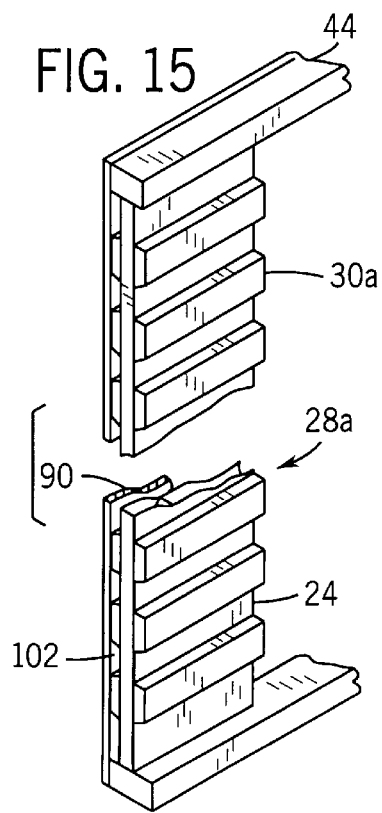
FIGS. 15 and 16 are fragmentary perspective views of panel sections according to alternative embodiments of the present invention.
Figure 16:
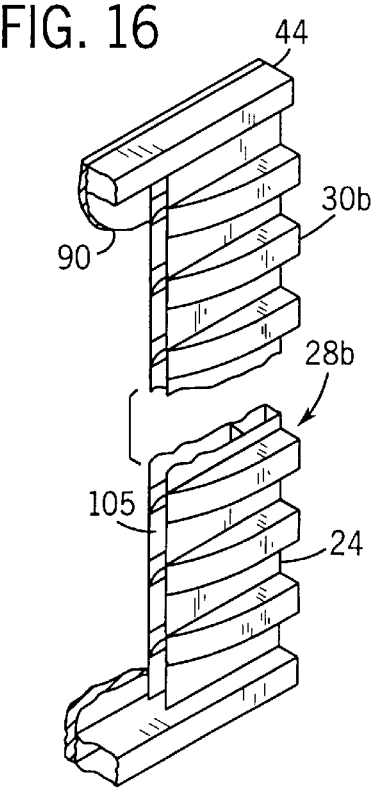

According to the alternative embodiment shown in FIGS. 15 and 16, a panel section 20 (shown partially) may be constructed with an open center portion between horizontal beams 44 and vertical posts 42 (and between the covering skins). Integrated with vertical posts 42 are partial walls (28a or 28b) having elongate protrusions, shown as rectangular blocks 30a in FIG. 15 and as wedges 30b in FIG. 16, which allow attachment of covering skins 90 and define spaces 102 between covering skins 90 and the base surfaces 24 of partial walls (28a or 28b) for passage of cables 100 (not shown). The open central portion of panel section 20 freely provides for cable management in any direction between covering skins 90. According to alternative embodiments, the walls can be provided as separate sheets or strips of materials from the vertical posts that securely attach within the interior of the panel section, for example spanning between horizontal posts.

As shown in FIGS. 17 and 18, panel section 20 includes a single wall 22a reinforced by vertical posts 42 and horizontal beams 44; wall 22a is formed of a single metal sheet and has protrusions (frusto-conical projections 30) on one side that are larger than the protrusions (frusto-conical projections 32) on the other side. As shown in FIG. 17, sheet 22a is attached (fastened or mounted) to vertical posts 42 between horizontal beams 44 so that protrusions 30 define a space 102 on each side of wall 22a when covering skins 90 are attached. As is evident, according to alternative embodiments the panel section can be constructed to provide for cable passages (i.e. lay-in capability) on one side only.

FIGS. 3 and 5 show in greater detail the interconnection of the panel sections to form the partition wall system according to a preferred embodiment. Shown in FIG. 3 is a "stacking" arrangement of two panel sections 20 on a single mounting post 80 to form a partition wall system having a double unit height. As is shown in FIG. 5, a mounting post 80 of single unit height is used to interconnect panel sections to form a partition wall system of a single unit height. As shown, according to a preferred embodiment, panel sections 20 have a recess 62 (provided by bracket 60) at their lateral ends 64 into which mounting post 80 is partially received. Mounting post 80 (shown as a rectangular metal tube) also has projections (shown as tabs 82) which are received within and retained on corresponding slots 84 at lateral ends 64 of panel section 20 to secure panel section 20 to mounting post 80. As shown in FIG. 5, secure interconnection of panel sections 20 to mounting post 80 can be enhanced by employing fasteners (such as securing screws 68), which retain the panel sections to the mounting post 80 in their respective interconnected positions. According to a preferred embodiment, mounting post 80 stands on a leveler 86 (i.e. shown as a conventional threaded rod with a connected disk-shaped stand or foot to allow some degree of vertical adjustability).

As shown in FIG. 5, mounting post 80 may be provided with a set of slots 84 arranged vertically in a central portion of mounting post 80 (i.e. an exposed portion not received within the corresponding recesses 62 at the lateral ends of interconnected panel sections 20). A mounting structure 120 (of a type that allows for the mounting of work surfaces, binder bins or the like within the partition wall system) includes a frame 124 with a set of arms 123 and a series of projections (shown as hooks 122). Into slots 84 of mounting post 80 are received projections 122 (positioned at corresponding locations on the frame 124 to slots 84) that secure the mounting structure 120 within the partition wall system.

Figure 5A:
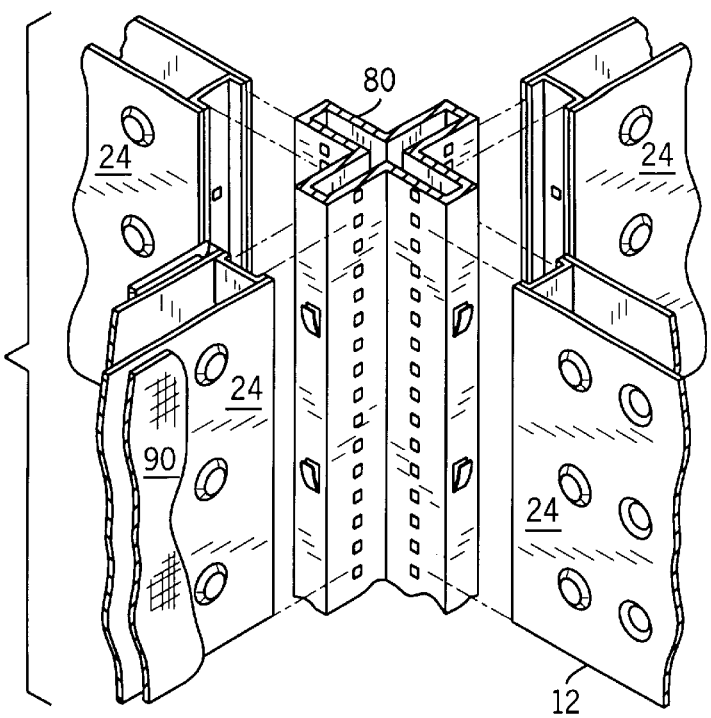
FIG. 5A is a fragmentary and exploded perspective view of a partition wall system showing a detail of the interconnection of panel sections to a mounting post according to an alternative embodiment of the present invention.
Figure 5B:
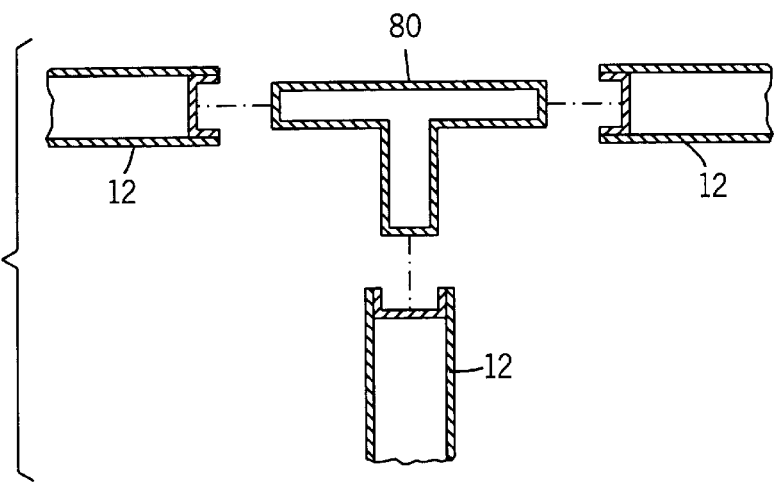
FIGS. 5B and 5C are plan views of additional mounting post configurations (of a type shown in FIG. 5A) that allow interconnection of panel sections in other orientations according to alternative embodiments of the present invention.
Figure 5C:
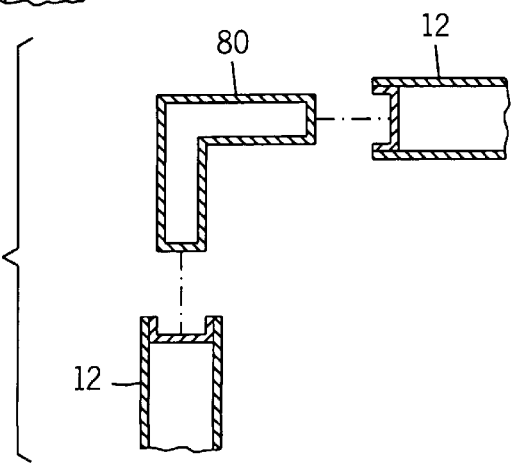
Figure 19:
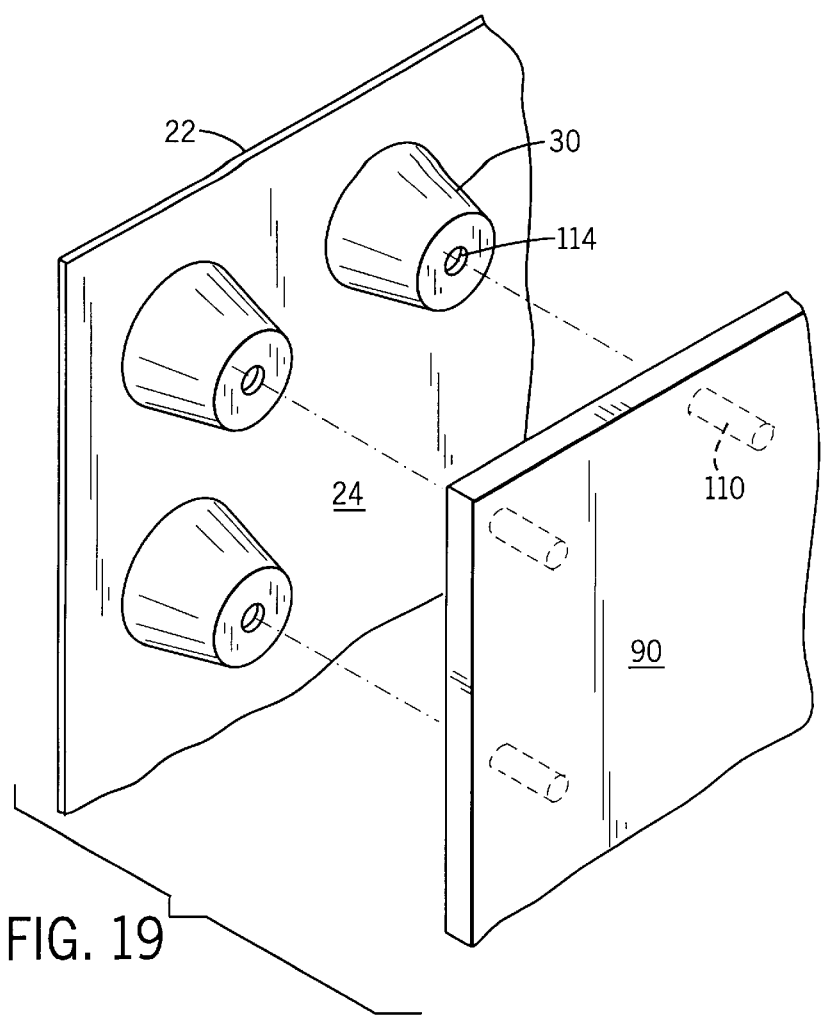
FIG. 19 is a fragmentary perspective view of the interconnection of a covering skin to a panel section according to a preferred embodiment of the present invention.
Figure 20:
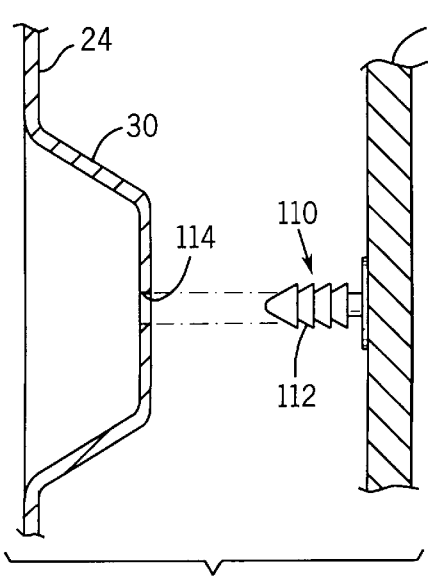
FIGS. 20 and 21 are fragmentary elevation views of the interconnection of the covering skin to the panel section according to the preferred embodiment shown in FIG. 19.
Figure 21:
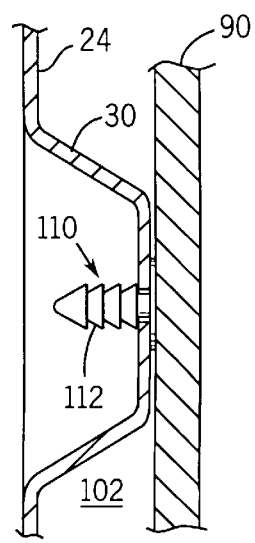

According to various alternative embodiments known to those in the art who review this disclosure, there are a wide variety of interconnection and mounting arrangements for forming a partition wall system from a plurality of panel sections, for constructing covering skins 90 (such as with fabric) and attaching them to the panel sections, and for mounting accessories, all of which are intended to be within the scope of the present inventions. As shown in FIGS. 5A through 5C, the interconnection of the panel sections can be made at other orientations using mounting posts of other configurations (than the shape shown in FIG. 5). FIG. 5A shows a top profile of a mounting post allowing the interconnection of four panel sections at a single point (i.e. a "+-shaped" mounting post). FIG. 5B shows a top profile of a mounting post allowing the interconnection of three panel sections at a single point (i.e. a "T-shaped" mounting post). FIG. 5C shows a top profile of a mounting post allowing the interconnection of two panel sections at a right angle (i.e. an "L-shaped" mounting post). As is evident, other interconnection orientations can be provided for by varying the shape of the mounting post. Various exemplary arrangements for interconnecting panel sections FIGS. 19 through 21 illustrate a particularly preferred embodiment wherein a covering skin 90 is provided with a plurality of inwardly projecting mounting pins 110 which are securely received and retained within corresponding aligned apertures 114 on or along at least certain of protrusions 30 of wall 22 of the panel section. As shown, mounting pins 110 have a series of concentrically-aligned conical locking detents 112 which provide for an overall effective outer diameter of the mounting pin 110 greater than the diameter of corresponding aperture 114. Mounting pins 110 are made of a compliant (e.g. deformable plastic or like resilient) material and can be pressed under force within aperture and thereby retained in aperture 114 by one of the detents. A "pull-out" force (up to a certain threshold value) is required to deform and thereby remove mounting pin 110 from corresponding aperture 114. Once pressed into the corresponding aperture 114, the mounting pins 110 will provide a locking and holding effect. According to alternative embodiments, the arrangement of apertures and mounting pins on protrusions and covering skins can be reversed, or any of a wide variety of other arrangements for securing covering skins to panel sections (e.g. adhesives, fasteners, spring clips, VELCRO™, etc.) can be employed. By employing more of the mounting pins, a greater overall holding force or more secure attachment can be provided for the covering skins.

Figure 22:
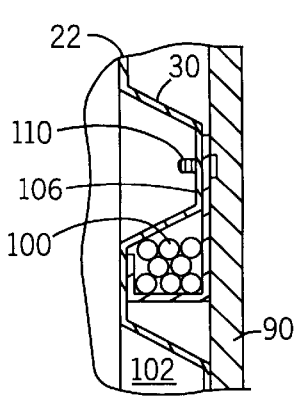
FIG. 22 is a fragmentary elevation view of a panel section (with covering skin attached) showing a cable tray according to a preferred embodiment of the present invention.
Figure 23:
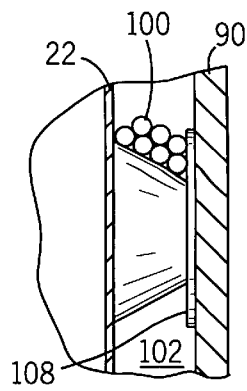
FIG. 23 is a fragmentary elevation view of a panel section (with covering skin attached) showing a cable retainer according to an alternative embodiment of the present invention.
Figure 24:
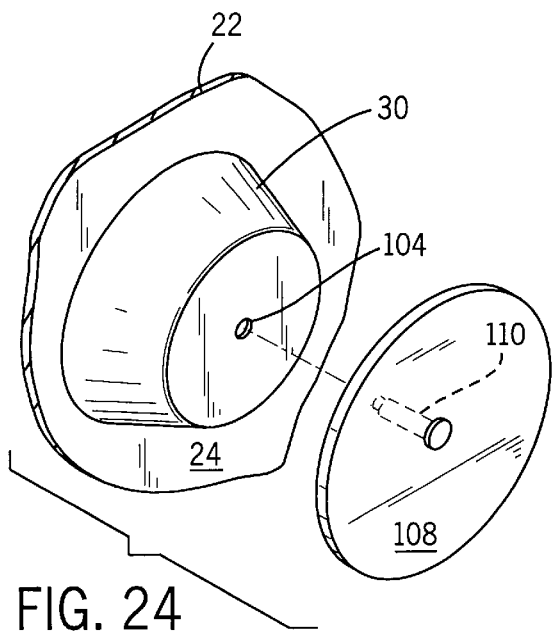
FIG. 24 is a fragmentary perspective view of the panel section showing the cable retainer of FIG. 23.

FIGS. 22 through 24 show cable management accessories for use with the partition wall system according to a preferred embodiment. A cable retainer in the form of retaining plate 106 or retaining tray 108 (or some other structure or hook of similar capability) can be secured to one or more protrusions 30 in the panel section 20. As shown in FIGS. 22 through 24, the cable retainer can be attached to the panel section by a mounting pin 110 (of a type shown in FIGS. 20 and 21) or by any other fastening or mounting arrangement. As shown in FIG. 22, a retaining tray 108 will hold cables 100 beneath protrusion 30 in the cable lay-in space 102 provided between the base surface 24 of wall 22 and covering skin 90. As shown in FIGS. 23 and 24, a retaining plate 106 will hold cables 100 above protrusion 30 in the cable lay-in space 102 provided between the base surface 24 of wall 22 and covering skin 90.

Although only a few exemplary embodiments of this invention have been described in detail, those skilled in the art who review this disclosure will readily appreciate that many modifications are possible in the exemplary embodiments without materially departing from the novel teachings and advantages of this invention. It is readily apparent that panel sections constructed according to the present invention can be made in any of a wide variety of shapes, sizes and thicknesses, with a wide variety of weights and strengths, and can be incorporated into a wide variety of partition wall systems with a wide variety of types of covering skins or interconnection and cable management arrangements. Accordingly, all such modifications are intended to be included within the scope of the invention as defined in the appended claims. In the claims, any means-plus-function clause is intended to cover the structures described herein as performing the recited function and not only structural equivalents but also equivalent structures.

Other substitutions, modifications, changes and omissions may be made in the design, operating conditions and arrangement of the preferred embodiments without departing from the spirit of the invention as expressed in the appended claims.

What is claimed is:

1. A selectively reconfigurable partition wall system for installation within an interior space of a building and configured to provide for passage of generally flexible cables for at least one of electrical transmission or data transmission, comprising:
   a plurality of panel sections; and
   a plurality of covering tiles mountable to the panel sections;
   wherein each of the plurality of panel sections includes
      a generally planar septum to divide the panel section, the septum having a first side and a second side;
      a first plurality of protrusions extending from the first side of the septum, wherein at least one of the first plurality of protrusions has a frusto-conical shape;
      a second plurality of protrusions extending from the second side of the septum;
   so that passages for cables are defined on the first side and on the second side of the septum between the septum and the covering tiles for the selective routing of the cables upon removal of at least one of the covering tiles after installation of the partition wall.

2. The partition wall system of claim 1 wherein the septum of each of the panel sections further comprises a first plurality of depressions formed in the first side of the septum and a second plurality of depressions formed in the second side of the septum.

3. The partition wall system of claim 1 wherein at least one of the plurality of panel sections includes at least one aperture configured to allow cables to be passed therethrough.

4. The partition wall system of claim 1 wherein the septum comprises a first sheet of material and a second sheet of material and wherein the first sheet of material is attached to the second sheet of material so that the first sheet of material is substantially parallel to the second sheet of material.

5. The partition wall system of claim 4 wherein the panel section further comprises a set of horizontal beams attached to at least one of the first sheet of material or to the second sheet of material and adapted to provide structural rigidity for the panel sections.

6. The partition wall system of claim 1 wherein the septum provides an at least partially rigidifying structure for at least one of the panel sections.

7. The partition wall system of claim 1 wherein the material is metal.

8. The partition wall system of claim 1 further comprising at least one cable retainer attached to at least one of the panel sections.

9. The partition wall system of claim 1 wherein the septum is a structural insert to at least partially rigidify at least one of the panel sections.

10. The partition wall system of claim 1 wherein the panel section includes a first wall formed by the first side and a second wall formed by the second side.

11. The partition wall system of claim 10 wherein the first wall of the panel section and the second wall of the panel section are substantially parallel to the covering tiles when attached to the plurality of panel sections.

12. The partition wall system of claim 11 wherein the first plurality of protrusions form an attachment plane substantially parallel to the covering tiles.

13. The partition wall system of claim 1 wherein the first plurality of protrusions are arranged in a symmetrical pattern.

14. The panel system of claim 1 wherein at least one of the plurality of panel sections includes a substantially open central space.

15. A selectively reconfigurable partition wall system for installation within an interior space of a building and configured to provide for passage of generally flexible cables for at least one of electrical transmission or data transmission, comprising:
    a plurality of panel sections; and
    a plurality of covering tiles mountable to the panel sections;
    wherein each of the plurality of panel sections includes:
       a generally planar septum to divide the panel section, the septum having a first side and a second side and comprising a first sheet of metal material providing a base surface for the first side and a second sheet of metal material providing a base surface for the second side;
       a first plurality of protrusions extending from and formed in the first side of the septum;
       a second plurality of protrusions extending from and formed in the second side of the septum;
    so that passages for cables are defined on the first side and on the second side of the septum between the septum and the covering tiles for the selective routing of the cables upon removal of at least one of the covering tiles after installation of the partition wall.

16. The partition wall system of claim 15 wherein at least one of the plurality of panel sections includes an aperture configured to allow cables to be passed therethrough.

17. The partition wall system of claim 15 wherein the first sheet of material of the septum is coupled in a substantially parallel relationship to the second sheet of material of the septum.

18. The partition wall system of claim 15 wherein the panel section further includes at least one beam attached to at least one of the first side or the second side of the septum and adapted to provide structural rigidity for the panel sections.

19. The partition wall system of claim 15 further comprising at least one cable retainer attached to at least one of the panel sections.

20. The partition wall system of claim 15 wherein the septum includes a plurality of depressions formed in at least one of the first side of the septum or the second side of the septum.

21. The partition wall system of claim 15 wherein the first sheet of material further comprises a plurality of depressions formed therein.

22. The partition wall system of claim 15 wherein at least one of the first plurality of protrusions has a frusto-conical shape.

23. A selectively reconfigurable partition wall system for installation within an interior space of a building and configured to provide for passage of generally flexible cables for at least one of electrical transmission or data transmission, comprising:
    a plurality of panel sections including:
        a generally planar septum to divide the panel section, the septum having a first side and a second side comprising a first sheet of material including a plurality of depressions formed therein, and providing a base surface for the first side and a second sheet of material providing a base surface for the second side;
        a first plurality of protrusions extending from and formed in the first side of the septum;
        a second plurality of protrusions extending from and formed in the second side of the septum;
    a plurality of covering tiles mountable to the panel sections;
    so that passages for cables are defined on the first side and on the second side of the septum between the septum and the covering tiles for the selective routing of the cables upon removal of at least one of the covering tiles after installation of the partition wall.

24. The partition wall system of claim 23 wherein the septum includes a plurality of depressions formed in at least one of the first side of the septum or the second side of the septum.

25. The partition wall system of claim 23 wherein at least one of the plurality of panel sections includes at least one aperture configured to allow cables to be passed therethrough.

26. The partition wall system of claim 23 wherein the first sheet of material of the septum is coupled in a substantially parallel relationship to the second sheet of material of the septum.

27. The partition wall system of claim 23 wherein the panel section further includes at least one beam attached to at least one of the first side or the second side of the septum and adapted to provide structural rigidity for the panel sections.

28. The partition wall system of claim 23 further comprising at least one cable retainer attached to at least one of the panel sections.

29. The partition wall system of claim 23 wherein at least one of the plurality of protrusions includes a frusto-conical shape.

30. The partition wall system of claim 23 wherein the material includes a metal.

31. The partition wall system of claim 23 wherein the covering tiles comprise covering skins.

32. The partition wall system of claim 23 wherein the passages for cables are formed between the covering tiles and at least one of the base surfaces of the panel section to allow the cables to selectively be routed between interconnected panel sections and through each panel section in both horizontal and vertical directions.

* * * * *